United States Patent
Li et al.

(10) Patent No.: US 12,348,724 B2
(45) Date of Patent: Jul. 1, 2025

(54) FUSION OF VIDEO PREDICTION MODES

(71) Applicant: Alibaba Innovation Private Limited, Singapore (SG)

(72) Inventors: Xinwei Li, San Mateo, CA (US); Ru-Ling Liao, San Mateo, CA (US); Jie Chen, San Mateo, CA (US); Yan Ye, San Mateo, CA (US)

(73) Assignee: Alibaba Innovation Private Limited, Singapore (SG)

( * ) Notice: Subject to any disclaimer, the term of this patent is extended or adjusted under 35 U.S.C. 154(b) by 200 days.

(21) Appl. No.: 18/146,172

(22) Filed: Dec. 23, 2022

(65) Prior Publication Data
US 2023/0217026 A1    Jul. 6, 2023

Related U.S. Application Data

(60) Provisional application No. 63/296,533, filed on Jan. 5, 2022.

(51) Int. Cl.
| | |
|---|---|
| *H04N 19/132* | (2014.01) |
| *H04N 19/105* | (2014.01) |
| *H04N 19/176* | (2014.01) |
| *H04N 19/182* | (2014.01) |
| *H04N 19/186* | (2014.01) |
| *H04N 19/46* | (2014.01) |

(52) U.S. Cl.
CPC ......... *H04N 19/132* (2014.11); *H04N 19/105* (2014.11); *H04N 19/176* (2014.11); *H04N 19/182* (2014.11); *H04N 19/186* (2014.11); *H04N 19/46* (2014.11)

(58) Field of Classification Search
CPC .... H04N 19/00; H04N 19/132; H04N 19/105; H04N 19/176; H04N 19/182; H04N 19/186; H04N 19/46
See application file for complete search history.

(56) References Cited

U.S. PATENT DOCUMENTS

| | | | |
|---|---|---|---|
| 2021/0112263 A1 | 4/2021 | Choi | |
| 2024/0244195 A1* | 7/2024 | Wang | .................. H04N 19/159 |

FOREIGN PATENT DOCUMENTS

| | | |
|---|---|---|
| CN | 1747552 A | 3/2006 |
| CN | 108702515 B | 10/2021 |
| CN | 110719467 B | 4/2022 |

OTHER PUBLICATIONS

"Requirements for a Future Video Coding Standard v5," International Organisation for Standardisation, Torino, IT, 14 pages (2017).
Chen et al., "Algorithm Description of Joint Exploration Test Model 7 (JEM 7)," JVET-G1001-v1, 7th Meeting: Torino, IT, Jul. 13-21, 2017, 50 pages.

(Continued)

*Primary Examiner* — Kyle M Lotfi
(74) *Attorney, Agent, or Firm* — Finnegan, Henderson, Farabow, Garrett & Dunner, LLP

(57) ABSTRACT

The present disclosure provides methods and systems for fusing chroma intra prediction modes. An exemplary method includes: generating a plurality of predicted chroma samples associated with a pixel, by using a plurality of chroma intra prediction modes respectively; and determining a first predicted chroma sample, based on a weighted sum of the plurality of predicted chroma samples.

20 Claims, 9 Drawing Sheets

(56) References Cited

OTHER PUBLICATIONS

Chen et al., "Algorithm description for Versatile Video Coding and Test Model 11 (VTM 11)," JVET-T2002-v1, $20^{th}$ meeting by teleconference, Oct. 7-16, 2020, 104 pages.

Coban et al., Algorithm description of Enhanced Compression Model 3 (ECM 3), JVET-X2025, $23^{rd}$ meeting, by teleconference, Jul. 7-16, 2021, 28 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Jem, https://jvet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

Zhang et al., "Enhanced Cross-Component Linear Model for Chroma Intra-Prediction in Video Coding," IEEE Transactions on Image Processing, vol. 27, No. 8, Aug. 2018.

PCT International Search Report and Written Opinion mailed Feb. 20, 2023, issued in corresponding International Application No. PCT/CN2023/070540 (6 pgs.).

\* cited by examiner

FUSION OF VIDEO PREDICTION MODES

CROSS-REFERENCE TO RELATED APPLICATIONS

The present disclosure claims priority to U.S. Provisional Application No. 63/296,533, filed on Jan. 5, 2022, which is incorporated herein by reference in its entirety.

TECHNICAL FIELD

The present disclosure generally relates to video processing, and more particularly, to methods and systems for fusing chroma intra prediction modes.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure are directed to fusing chroma intra prediction modes. In some embodiments, an exemplary method for processing video data includes: generating a plurality of predicted chroma samples associated with a pixel, by using a plurality of chroma intra prediction modes respectively; and determining a first predicted chroma sample, based on a weighted sum of the plurality of predicted chroma samples.

Embodiments of the present disclosure provide an apparatus for processing video data. The system comprises: a memory storing a set of instructions; and one or more processors configured to execute the set of instructions to cause the apparatus to perform: generating a plurality of predicted chroma samples associated with a pixel, by using a plurality of chroma intra prediction modes respectively; and determining a first predicted chroma sample, based on a weighted sum of the plurality of predicted chroma samples.

Embodiments of the present disclosure further provide a non-transitory computer readable medium that stores a bitstream of video for processing according to a method including: generating a plurality of predicted chroma samples associated with a pixel, by using a plurality of chroma intra prediction modes respectively; and determining a first predicted chroma sample, based on a weighted sum of the plurality of predicted chroma samples.

Embodiments of the present disclosure further provide a non-transitory computer readable medium that stores a set of instructions that is executable by one or more processors of an apparatus to cause the apparatus to initiate a method for processing video data. The method includes: generating a plurality of predicted chroma samples associated with a pixel, by using a plurality of chroma intra prediction modes respectively; and determining a first predicted chroma sample, based on a weighted sum of the plurality of predicted chroma samples.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
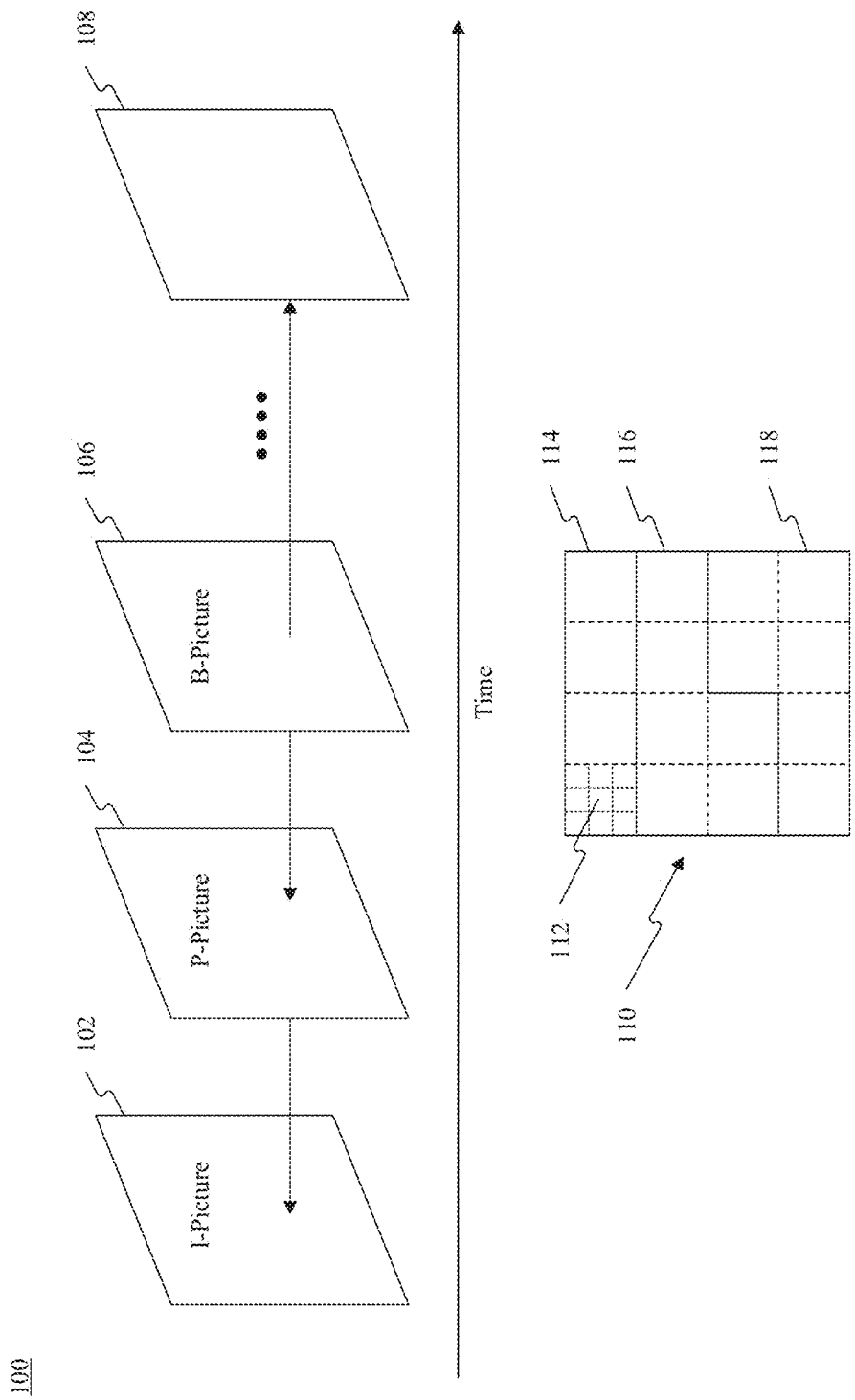
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
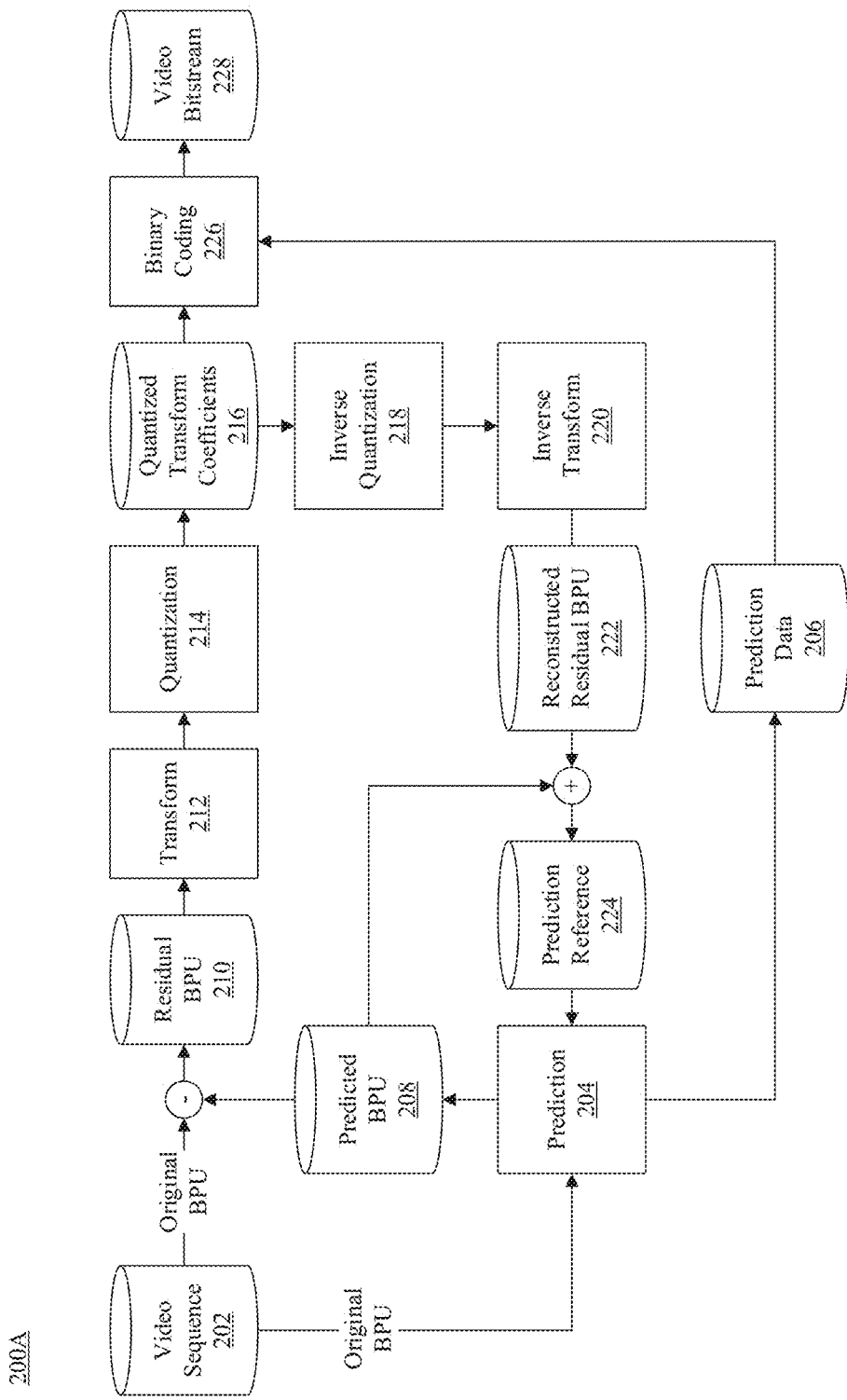
FIG. 2A is a schematic diagram illustrating an exemplary encoding process of a hybrid video coding system, consistent with embodiments of the disclosure.
Figure 2B:
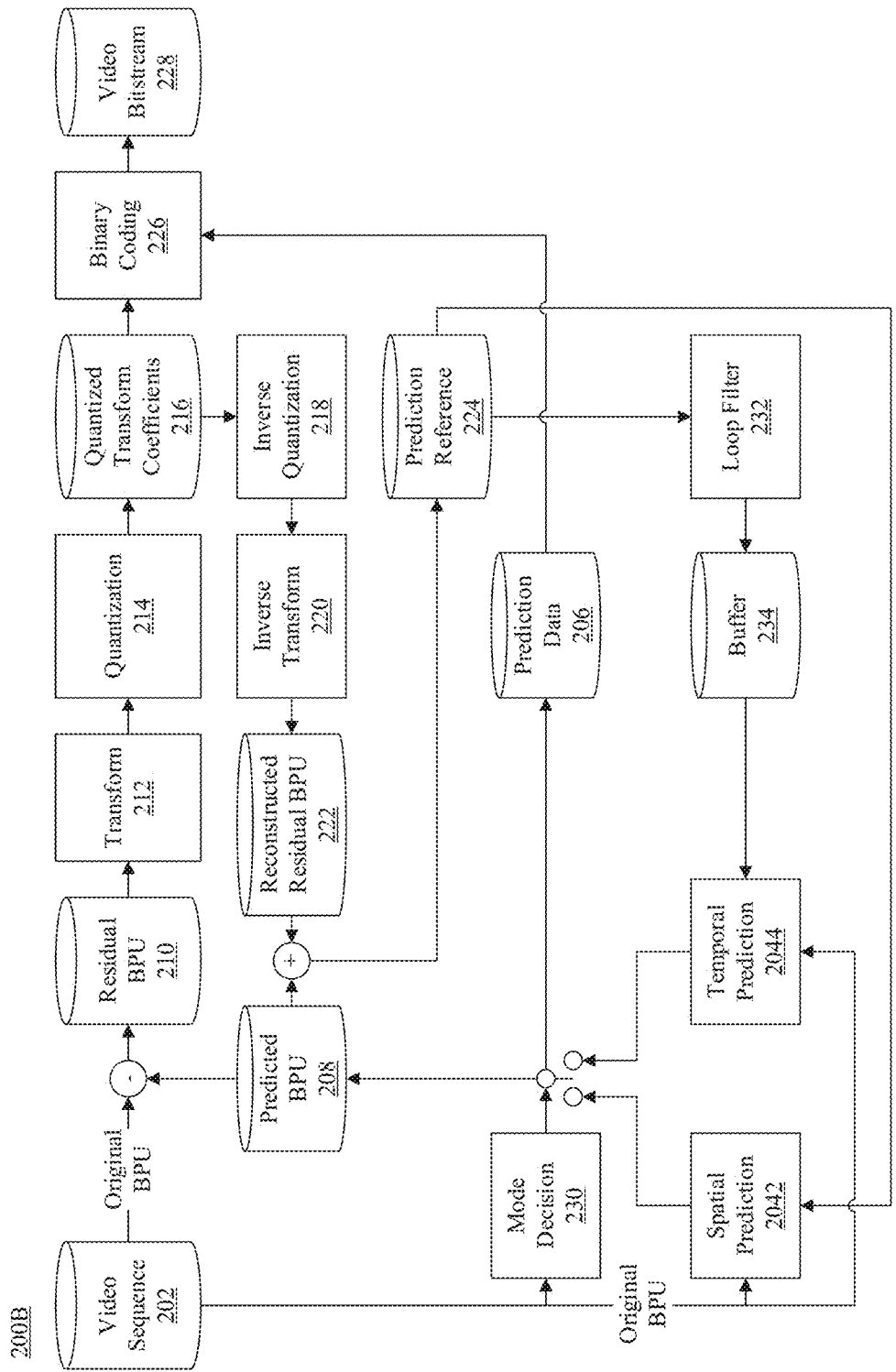
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets (SAO), adaptive loop filters (ALF), or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
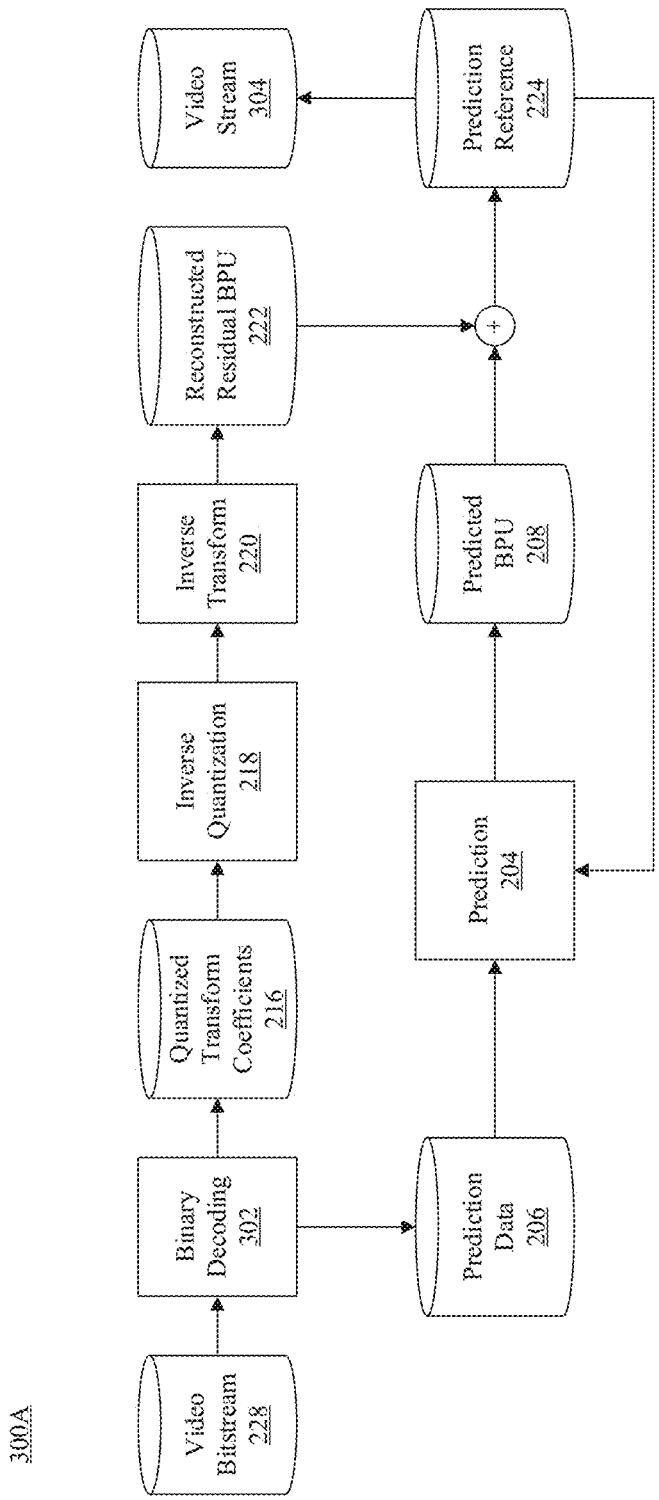
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
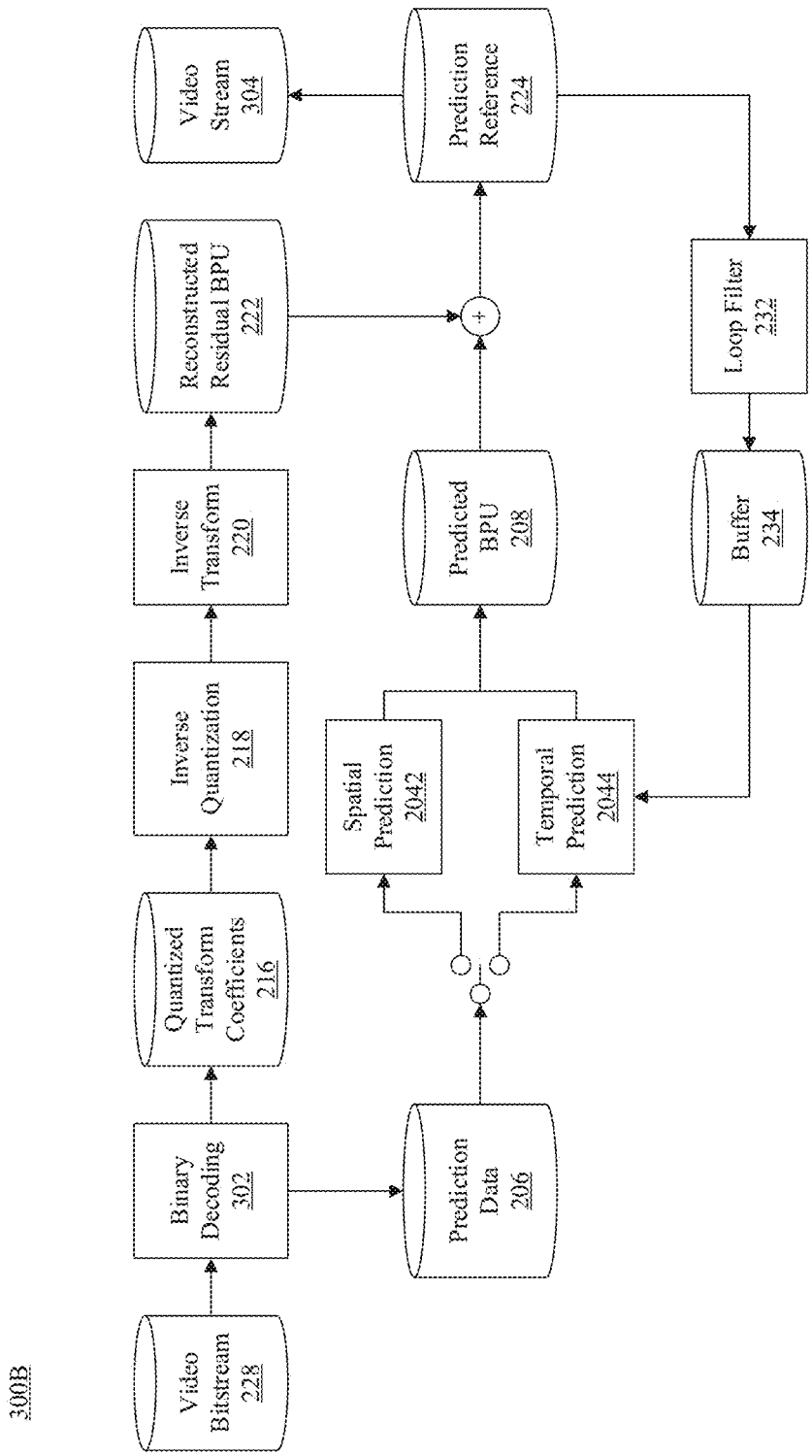
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
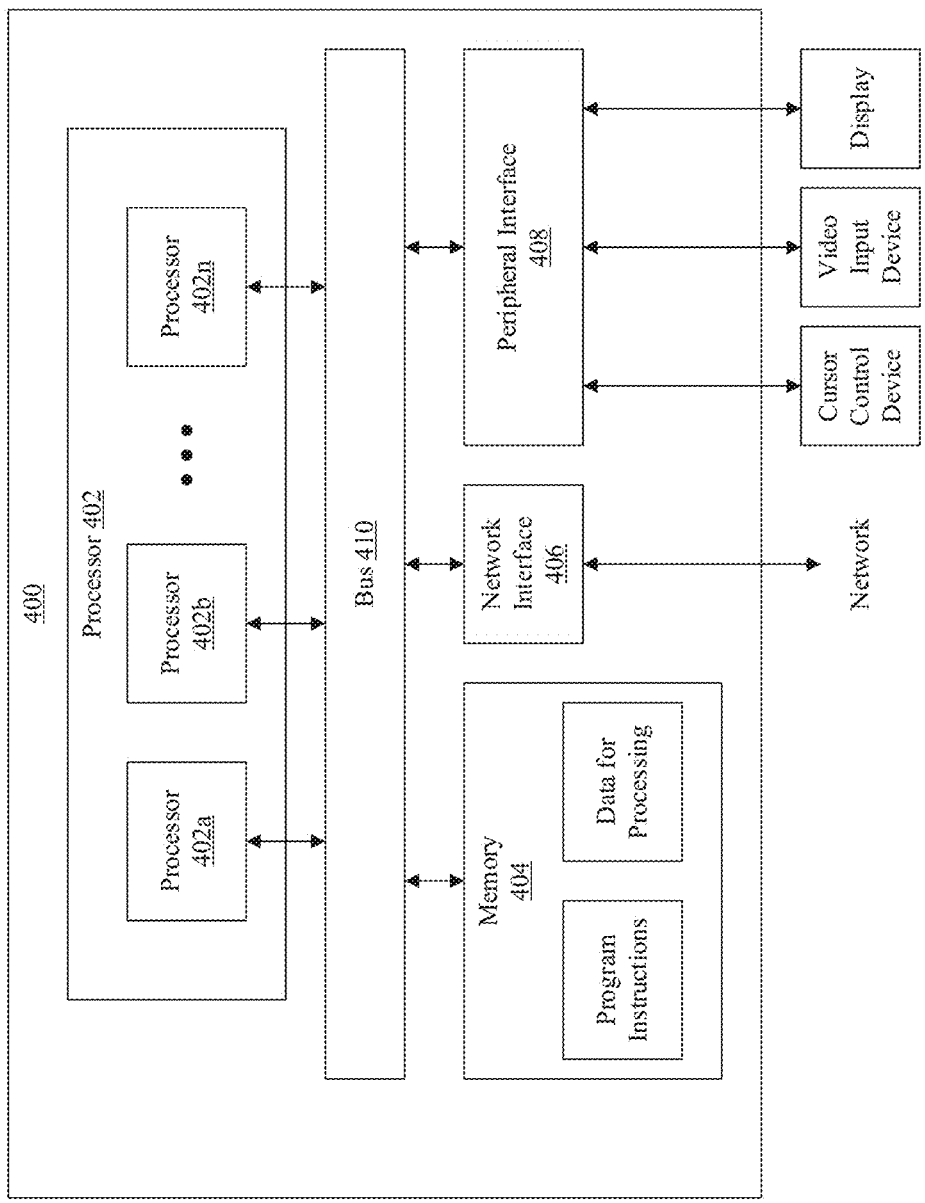
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Next, the luma and chroma intra prediction modes used in VVC are described. In VVC, the coding tree scheme supports separate block tree structures for luma and chroma components, respectively. A CTU can include three CTBs (Coding Tree Block), namely, one luma CTB (Y) and two chroma CTBs (Cb and Cr). For P and B slices, the luma and chroma CTBs in one CTU share the same coding tree structure. In contrast, for I slices, the luma and chroma CTBs can have separate block tree structures. When separate block tree structures are applied, luma CTB is partitioned into CUs using one coding tree structure, and the chroma CTBs are partitioned into chroma CUs using another coding tree structure. This means that a CU in an I slice may include either a coding block for the luma component or coding blocks for the two chroma components, and a CU in a P or B slice always includes coding blocks for all three color components, unless the video is monochrome—meaning there are no chroma components.

Consistent with the disclosed embodiments, VVC supports the following intra prediction modes for the luma component: planar mode, DC mode, angular intra prediction mode, multiple reference line (MRL) prediction mode, intra sub-partition (ISP) mode, and matrix-based intra prediction (MIP) mode. These intra prediction modes are described below in detail.

Angular intra prediction is a directional intra prediction method that is supported in HEVC and VVC. To capture the arbitrary edge directions presented in natural video, the number of angular intra prediction modes in VVC is extended from 33, as used in HEVC, to 65. The new angular intra prediction modes not in HEVC are depicted as dotted arrows in FIG. 5.

Figure 5:
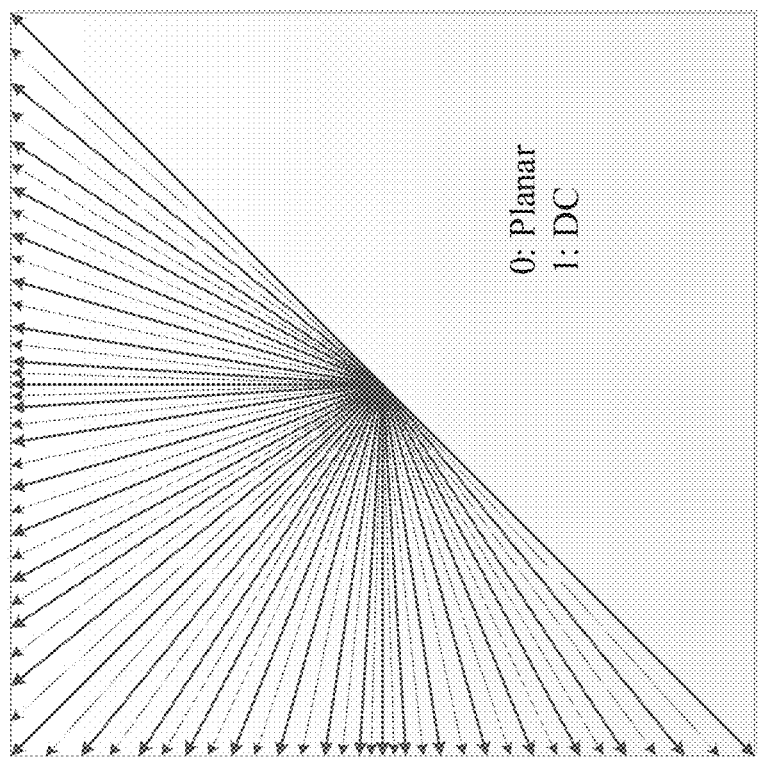
FIG. 5 illustrates 67 intra prediction modes, according to some embodiments of the present disclosure.

As in HEVC, two non-angular intra prediction modes, DC and planar modes are also supported in VVC. Thus, FIG. 5 shows a total of 67 intra prediction modes. The DC intra prediction mode uses the mean sample value of the reference samples to the block for prediction generation. VVC uses the reference samples only along the longer side of a rectangular block to calculate the mean value, while for square blocks the reference samples from both left and above sides are used. In the planar mode, the predicted sample values are obtained as a weighted average of 4 reference sample values. Here, the reference samples in the same row or column as the current sample and the reference samples on the bottom-left and on the top-right position with respect to the block are used.

For MRL modes, in addition to the directly adjacent line of neighboring samples, one of the two non-adjacent reference lines can comprise the input for intra prediction in VVC.

The ISP mode divides luma intra-predicted blocks vertically or horizontally into 2 or 4 sub-partitions depending on the block size. For each sub-partition, the prediction and transform coding operations are performed separately, but the intra prediction mode is shared across all sub-partitions.

The MIP mode is a newly added intra prediction technique into VVC. For predicting the samples of a block of width W and height H, MIP takes one line of H reconstructed neighboring boundary samples left of the block and one line of W reconstructed neighboring boundary samples above the block as input. The generation of the prediction signal is based on the following three steps: a down-sampling of the reference samples, a matrix vector multiplication, and an up-sampling of the result by linear interpolation.

In the Enhanced Compression Model (ECM), several video compression technologies beyond VVC are explored. Two luma intra prediction modes are proposed, namely, decoder-side intra mode derivation (DIMD) mode and template-based intra mode derivation (TIMD) mode. When DIMD is applied, two intra prediction modes from 65 angular modes are derived from the reconstructed neighbor samples, and those two predictors are combined with the planar mode predictor with the weights derived from the gradients. When TIMD is applied, for each intra prediction mode in a list, the SATD between the predicted and reconstructed samples of a template is calculated. First two intra prediction modes with the minimum SATD are selected and fused with the weights derived from the SATD.

Next, chroma intra prediction modes are described. The intra prediction modes enabled for the chroma components in VVC are: three Cross Component Linear Model (CCLM) modes including CCLM_LT, CCLM_L and CCLM_T; the Direct Mode (DM); and four default intra prediction modes. These chroma intra prediction modes are described below in detail.

To reduce the cross-component redundancy, three CCLM prediction modes are used in the VVC, for which the chroma components of a block can be predicted from the collocated reconstructed luma samples by linear models whose parameters are derived from already reconstructed luma and chroma samples that are adjacent to the block. The chroma samples can be predicted according to Equation 1:

$$\text{pred}_C(i,j) = \alpha \cdot \text{rec}_L'(i,j) + \beta \quad \text{(Equation 1)}$$

where $\text{pred}_C(i,j)$ represents the predicted chroma samples in the current chroma block and $\text{rec}_L'(i,j)$ represents the collocated reconstructed luma samples which are down-sampled for the case of non-4:4:4 color format. The linear model parameters $\alpha$ and $\beta$ are derived based on reconstructed neighboring luma and chroma samples at both encoder and decoder sides without explicit signaling.

Three CCLM modes, i.e., the CCLM_LT, CCLM_L, and CCLM_T modes, are specified in VVC. These three modes differ from each other with respect to the locations of the reconstructed neighboring samples that are used for linear model parameters derivation. Samples from the top boundary are involved in the CCLM_T mode and samples from the left boundary are involved in the CCLM_L mode. In the CCLM_LT mode, samples from both the top boundary and the left boundary are used.

To match the chroma sample locations for 4:2:0 or 4:2:2 color format video sequences, two types of down-sampling filter can be applied to luma samples, both of which have a 2-to-1 down-sampling ratio in the horizontal and vertical directions. Based on the SPS-level flag information, the 2-dimensional 6-tap ($f_1$ in Equation 2) or 5-tap ($f_2$ in Equation 2) filter is applied to the luma samples within the current block as well as its neighboring luma samples.

$$f1 = \begin{pmatrix} 0 & 1 & 0 \\ 1 & 4 & 1 \\ 0 & 1 & 0 \end{pmatrix} \quad \text{(Equation 2)}$$

$$f2 = \begin{pmatrix} 1 & 2 & 1 \\ 1 & 2 & 1 \end{pmatrix}$$

The linear model parameters $\alpha$ and $\beta$ are derived based on reconstructed neighboring luma and chroma samples at both the encoder and decoder sides to avoid any signaling overhead. In the initially adopted version of the CCLM mode, the linear minimum mean square error (LMMSE) estimator was used for derivation of the parameters:

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)}$$ (Equation 3)

$$\beta = \frac{\sum C(n) - \alpha \cdot \sum L(n)}{N}$$ (Equation 4)

where L(n) represents the down-sampled top or left neighboring reconstructed luma samples, C(n) represents the top or left neighboring reconstructed chroma samples, and value of N is equal to the number of the used samples.

In the final design, however, only four samples are involved to reduce the computational complexity. For an M×N chroma block, the four samples used in the CCLM_LT mode are samples located at the positions of M/4 and 3M/4 at the top boundary and at the positions of N/4 and 3N/4 at the left boundary. In CCLM_T and CCLM_L modes, the top and left boundary are extended to a size of (M+N) samples, and the four samples used for the model parameter derivation are located at the positions (M+N)/8, 3(M+N)/8, 5(M+N)/8 and 7(M+N)/8. After the four samples are selected, four comparison operations are used to determine the two smallest and the two largest luma sample values among them. Let $L_{max}$ denote the average of the two largest luma sample values and let $L_{min}$ denote the average of the two smallest luma sample values. Similarly, let $C_{max}$ and $C_{min}$ denote the averages of the corresponding chroma sample values. Then, the linear model parameters are obtained:

$$\alpha = \frac{Cmax - Cmin}{Lmax - Lmin},$$ (Equation 5)

$$\beta = Cmin - \alpha \cdot Lmin$$

In ECM, CCLM included in VVC is extended by adding three multi-model LM (MMLM) modes: MMLM_LT, MMLM_L, and MMLM_T. In each MMLM mode, the reconstructed neighboring samples are classified into two classes using a threshold which is the average of the luma reconstructed neighboring samples. The linear model of each class is derived using the LMMSE method. To improve prediction accuracy, two variant modes of the LM mode are also included in ECM: Convolutional Cross-Component Model (CCCM) mode and Gradient Linear Model (GLM) mode. In CCCM mode, the neighboring down-sampled luma samples are also used to predict the current chroma sample which extend the number of the model parameters to 7. In GLM, the luma gradient is used to predict the current chroma sample.

Figure 6:
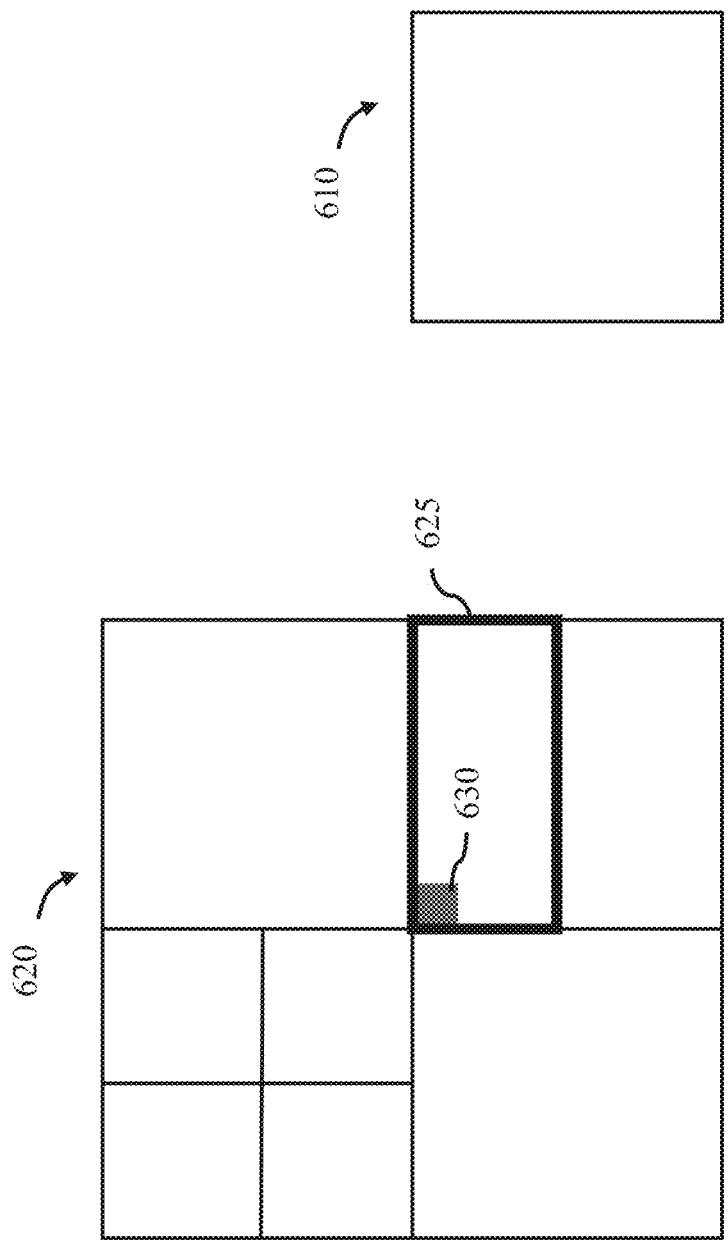
FIG. 6 illustrates a chroma coding block corresponds to multiple luma coding blocks in an I slice, according to some embodiments of the present disclosure.

As described above, the intra prediction modes enabled for the chroma components in VVC include the DM mode. When the DM mode is used, the intra prediction mode of the corresponding luma block determines the chroma intra mode as follows. If the corresponding luma block uses the planar, DC or an angular mode, the same mode is used. If the corresponding luma block is coded using intra block copy (IBC) or palette mode, the DC mode is used. If the corresponding luma block is coded using block DPCM (BDPCM) mode, depending on the direction of the BDPCM, either the horizontal or the vertical intra prediction mode is used. If the corresponding luma block uses MIP, and if the chroma color format is 4:4:4 and the single partitioning tree is applied, the same MIP mode is applied for the chroma block and otherwise, the planar mode is applied. For B and P slices, the corresponding luma block represents the luma block at the same position as the current chroma block. For I slice, one chroma coding block may correspond to multiple luma coding blocks since the separate block partitioning structure for luma and chroma components is enabled. For example, FIG. 6 illustrates that a chroma coding block 610 has multiple collocated luma coding blocks 620 in an I slice. The corresponding luma block 625 is the luma coding block containing the center position luma sample 630.

As described above, the chroma intra prediction modes in VVC also include four default intra prediction modes. When the CCLM modes and DM mode are not used, the four default non-DM modes are given by the list {planar mode, vertical mode, horizontal mode, DC mode}. In cases where the DM mode already belongs to that list (i.e., the DM mode is the same as one of the four modes), the mode in the list is replaced with an angular mode with a mode index of 66.

In the signaling of the chroma intra mode, a flag cclm_mode_flag indicating whether CCLM is applied is signaled first. If the cclm_mode_flag is signaled as true, an index cclm_mode_idx is signaled to indicate which of the three CCLM modes is applied. In the non-CCLM case, a syntax intra_chroma_pred_mode is signaled to indicate which of the DM mode and the four default non-DM modes is applied. The binarization process for intra_chroma_pred_mode and the corresponding chroma intra prediction modes are shown in Table 1. When the first bin of intra_chroma_pred_mode is equal to 0, it means DM mode is applied. When the first bin of intra_chroma_pred_mode is equal to 1, it means one of the four default non-DM modes is applied. Accordingly, the first bin of intra_chroma_pred_mode can be regarded as a DM flag indicating whether DM mode is applied. If DM mode is not used, an index in the range of 0 to 3 is binarized by two bits using a fixed length codeword to determine which of the four non-DM modes is to be used.

TABLE 1

Exemplary binarization process for intra_chroma_pred_mode

| Value of intra_chroma_pred_mode | Bin string | Chroma intra prediction mode |
|---|---|---|
| 0 | 100 | list[0] |
| 1 | 101 | list[1] |
| 2 | 110 | list[2] |
| 3 | 111 | list[3] |
| 4 | 0 | DM mode |

Consistent with the disclosed embodiment, a decoder-side derived chroma mode can also be used for chroma intra prediction. A chroma intra prediction mode can be derived based on the texture gradients of the collocated reconstructed luma samples or the reconstructed chroma samples that are adjacent to the current chroma block at both encoder and decoder side.

Consistent with the disclosed embodiment, a new chroma intra prediction mode, called CCLM-Angular Prediction mode, can also be used for chroma intra prediction. If the intra chroma prediction of the current chroma block is an angular mode, a flag is signaled to indicate whether the CCLM-Angular mode is applied. If the CCLM-Angular mode is applied, both the angular intra prediction mode and the MMLM_LT mode prediction are performed, and the final prediction is set to be the average of the angular intra prediction and the MMLM_LT mode prediction.

In the above-described embodiments, the number of intra prediction modes available for chroma blocks is smaller than the number of intra prediction modes available for luma blocks. Therefore, the intra prediction results of the chroma blocks may not as accurate as the intra prediction results of the luma blocks. The chroma intra prediction has some prediction modes that use inter-component correlation and some prediction modes that use spatial correlation. Accordingly, fusing different chroma intra prediction modes may improve the accuracy of chroma intra prediction.

In the present disclosure, it is proposed to merge some chroma intra prediction modes to improve the coding efficiency of the chroma intra prediction. That is, the predicted sample values obtained by different chroma intra prediction modes are weighted to obtain more accurate predicted samples.

In some embodiments, n different chroma intra prediction modes are used to perform the intra prediction on the current chroma block to obtain n different predictors, and the n predictors are weighted to obtain the final predictor. The predictor refers to the predicted sample values of a coding block. Different predictors can be fused according to Equation 6.

$$\text{pred}(i,j) = w_0 * \text{pred}_0(i,j) + w_1 * \text{pred}_1(i,j) + \ldots + w_{n-1} * \text{pred}_{n-1}(i,j) \quad \text{(Equation 6)}$$

where pred(i,j) represents the final predicted chroma samples in the current chroma block, $\text{pred}_k(i,j)$ represents the predicted chroma samples in the current chroma block obtained by the k-th chroma intra prediction mode, $w_k$ represents the weight for the k-th chroma intra prediction mode (0<=k<n).

The n chroma intra prediction modes participating in the fusion can be any n modes of the intra prediction modes available for chroma blocks and the value of n is greater than 1 and less than or equal to the number of available chroma intra prediction modes. For example, the n chroma intra prediction modes can be any n modes from the CCLM_LT mode, the CCLM_L mode, the CCLM_T mode, the MMLM_LT mode, the MMLM_L mode, the MMLM_T mode, the DM mode, the four default modes, and the decoder-side derived chroma mode. And the value of n can be any integer value from 2 to 12. The weights of the n intra prediction modes can be the same or different. The weights are positive values and the sum of the n weights is 1.

In some embodiments, the n chroma intra prediction modes participating in the fusion include at least one LM mode and at least one non-LM mode. The LM mode can be one or more of the CCLM_LT mode, CCLM_L mode, CCLM_T mode, MMLM_LT mode, MMLM_L mode, MMLM_T mode, the CCCM mode, and the GLM mode. The non-LM mode can be one or more of the DM mode, the four default modes, and the decoder-side derived chroma mode.

In some embodiments, the n chroma intra prediction modes participating in the fusion includes the MMLM_LT mode and at least one non-LM mode.

In some embodiments, the n chroma intra prediction modes participating in the fusion includes the decoder-side derived chroma mode and at least one LM mode.

In some embodiments, the n chroma intra prediction modes participating in the fusion are different based on the slice type of the current picture. In one example, the fusion chroma intra prediction mode is only used for I slices and not used for B slices and P slices. In another example, the n chroma intra prediction modes participating in the fusion include MMLM_LT mode and one non-LM mode. For I slices, the non-LM mode is one of the DM mode, the four default modes, and the decoder-side derived chroma mode; and for B slices and P slices, the non-LM mode is the decoder-side derived chroma mode.

Consistent with the disclosed embodiments, the weights of the n chroma intra prediction modes participating in the fusion can be determined according to different methods.

In some embodiments, fixed weights are used to weigh different chroma intra prediction modes. In one example, equal weights are used. For example, if there are two chroma intra prediction modes used for the fusion, the weight of each mode is equal to ½. In another example, unequal weights are used. In another example, two chroma intra prediction modes used for the fusion—one mode is a LM mode and the other mode is a non-LM mode. Then, the weight of the LM mode is equal to ¼ and the weight of the non-LM mode is equal to ¾; or the weight of the LM mode is equal to ¾ and the weight of the non-LM mode is equal to ¼.

In some embodiments, multiple sets of weights can be selected for the fused chroma intra prediction modes and an index is signed to indicate which set of the selected weights is used for the current coding block. Specifically, the encoder selects the best weight index through a rate-distortion optimization (RDO) decision and signals the index to the bitstream, and the decoder can get the index from the bitstream. In one example, there are two chroma intra prediction modes used for fusion, and three sets of weights can be selected $\{w_0=¼, w_1=¾; w_0=½, w_1=½; w_0=¾, w_1=¼\}$. An index ranging from 0 to 2 is signaled to indicate which set of weight is used for the current block.

In some embodiments, multiple sets of weights can be selected based on the chroma prediction modes of the neighboring blocks. In one example, there are two chroma intra prediction modes used for fusion—one mode is a LM mode and the other mode is a non-LM mode. Then the weights for each mode can be determined based on the chroma prediction modes of the above adjacent chroma block and the left adjacent chroma block. Specifically, if both the above and left neighbors are LM mode coded, the weights for the LM mode and the non-LM mode are $\{¾, ¼\}$; if both the above and left neighbors are non-LM mode coded, the weights for the LM mode and the non-LM mode are $\{¼, ¾\}$; and if one of the above and left neighbors is LM mode coded and the other one is non-LM mode coded, the weights for the LM mode and the non-LM mode are $\{½, ½\}$. In particular, if the neighbor's chroma intra prediction mode is the proposed fusion mode, it is regarded as an LM mode or a non-LM mode for weight derivation of the current chroma block, or the weights of the neighboring chroma block is directly used for the current chroma block.

In some embodiments, multiple sets of weights can be selected based on the chroma prediction mode used for the fusion and based on the sample positions of the current chroma block. For example, there are two chroma intra prediction modes used for fusion—one mode is a non-angular mode and the other mode is an angular mode. The non-angular mode can be one or more of the planar mode, DC mode and LM modes. Then the weights for each mode can be determined based on the angular mode and sample positions, as illustrated by the following examples.

In one example, the chroma block is first vertically (for horizontal modes) or horizontally (for vertical modes) split into four equal-area regions, and different weights are used for different regions. For example, the four sets of weights ($w_0$, $w_1$)=(6/8, 2/8), ($w_0$, $w_1$)=(5/8, 3/8), ($w_0$, $w_1$)=(3/8, 5/8), and ($w_0$, $w_1$)=(2/8, 6/8) are used for the four regions, respectively. The $w_0$ is used for the angular mode, and the $w_1$ is used for the non-angular mode. The horizontal modes correspond to the angular modes with mode indices smaller than 34, and the vertical modes correspond to the angular modes with mode indices greater than 34.

In another example, the weight for each mode is related to the distance between the current sample and the reference sample according to the angular mode direction. The $w_0$ used for the angular mode is proportional to the distance, and the $w_1$ used for the non-angular mode is inversely proportional to the distance.

In some embodiments, the above-described embodiments for selecting the multiple sets of weights can be combined. For example, there are two chroma intra prediction modes used for fusion—one mode is a LM mode and the other mode is a non-LM mode. If the non-LM mode is a non-angular mode, the weights can be selected based on the chroma prediction modes of the neighboring blocks; and if the non-LM mode is an angular mode, the weights can be selected based on the chroma prediction mode used for the fusion and based on the sample positions of the current chroma block.

In some embodiments, the weights can be different based on the slice type of the current picture. For example, the method of selecting weights based on the intra prediction modes of the neighboring blocks is used for I slices, but equal weights are used for B and P slices.

The present disclosure also provides methods for signaling the chroma intra prediction modes participating in the fusion. When a chroma block is selected to use the proposed fusion mode for intra prediction, the chroma intra prediction modes participating in the fusion can be obtained through explicit signaling, implicitly derived from the information of the current block, or the combination of the two methods.

In some embodiments, an explicit signaling method is used to decide which modes are participating in the fusion. For example, only two modes are allowed to be weighted—one mode is one of DM mode, the four default modes and the decoder-side derived chroma mode; and the other mode is one of the CCLM_LT mode and MMLM_LT mode. Then, after signaling DM mode, the four default modes or the decoder-side derived chroma mode, a flag is signaled to indicate whether to merge with other mode. If the flag is true, another flag is signaled to indicate whether to merge with CCLM_LT mode or MMLM_LT mode.

In some embodiments, an implicit method is used to decide which modes are participating in the fusion. For example, only two modes are allowed to be weighted—one mode is one of DM mode, the four default modes and the decoder-side derived chroma mode; and the other mode is one of the CCLM_LT mode, CCLM_L mode and CCLM_T mode. Then, after signaling the DM mode, the four default modes or the decoder-side derived chroma mode, a flag is signaled to indicate whether to merge with other mode. If the flag is true, the other mode is decided based on the first mode. If the first mode is a non-angular mode, the second mode is determined to be CCLM_LT mode; if the first mode is a horizontal mode, the second mode is determined to be CCLM_L mode; and if the first mode is a vertical mode, the second mode is determined to be CCLM_T mode.

In some embodiments, the explicit signaling method and the implicit method are combined to decide which modes are participating in the fusion. For example, only two modes are allowed to be weighted—one mode is one of DM mode, the four default modes and the decoder-side derived chroma mode; and the other mode is one of the CCLM_LT mode, CCLM_L mode, CCLM_T mode, MMLM_LT mode, MMLM_L mode and MMLM_T mode.

Then after signaling DM mode, the four default modes or the decoder-side derived chroma mode, a flag is signaled to indicate whether to merge with other mode. If the flag is true, another flag is signaled to indicated whether to merge with CCLM mode or MMLM mode. Then, the other mode is further decided based on the first mode. If the first mode is a non-angular mode, the second mode is determined to be CCLM_LT/MMLM_LT mode; if the first mode is a horizontal mode, the second mode is determined to be CCLM_L/MMLM_L mode; and if the first mode is a vertical mode, the second mode is determined to be CCLM_T/MMLM_T mode.

The embodiments provided by the present disclosure can be freely combined. In one example, there are two chroma intra prediction modes used for fusion—one mode is a non-LM mode and the other mode is MMLM_LT mode. The non-LM mode can be one of the DM mode, the four default modes and the decoder-side derived chroma mode. And the weights for the non-LM mode and the MMLM_LT mode is determined based on the chroma prediction modes of the neighboring blocks. Specifically, if both the above and left neighbors are LM mode coded, the weights for MMLM_LT mode and the non-LM mode are {3/4, 1/4}; if both the above and left neighbors are non-LM mode coded, the weights for MMLM_LT mode and the non-LM mode are {1/4, 3/4}; if one of the above and left neighbors are LM mode coded and the other one is non-LM mode coded, the weights for MMLM_LT mode and the non-LM mode are {1/2, 1/2}. In particular, if the neighbor's chroma intra prediction mode is the proposed fusion mode, it is regarded as a non-LM mode. And after signaling DM mode, the four default modes or the decoder-side derived chroma mode, a flag is signaled to indicate whether to merge with MMLM_LT mode. In another example, there are two chroma intra prediction modes used for fusion—one mode is a non-LM mode and the other mode is MMLM_LT mode. The non-LM mode used for I slices can be one of the DM mode, the four default modes and the decoder-side derived chroma mode, and the non-LM mode used for B slices and P slices is the decoder-side derived chroma mode. And the weights for the non-LM mode and the MMLM_LT mode used for I slices are determined based on the chroma prediction modes of the neighboring blocks, and the weights used for B and P slices are equal weights.

Figure 7:
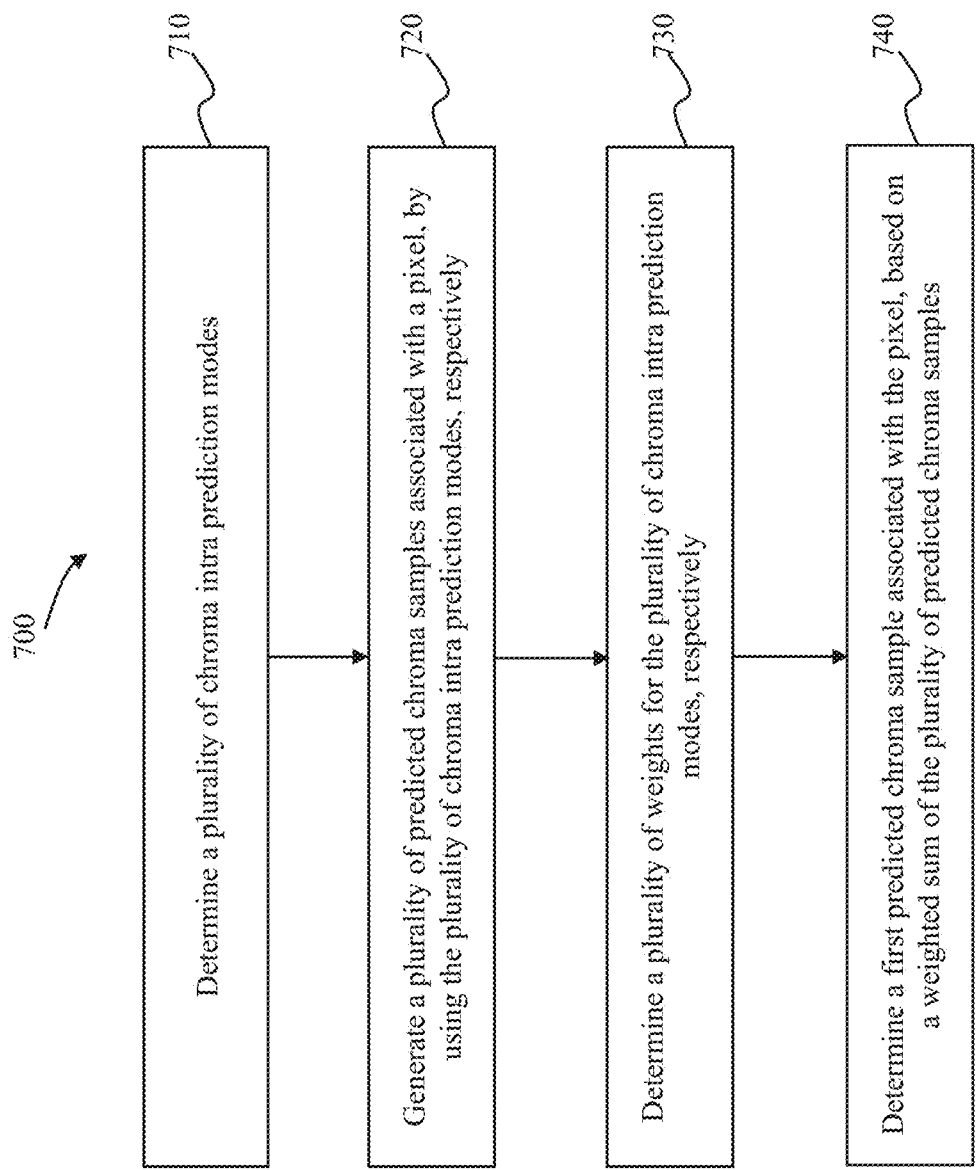
FIG. 7 is a flow chart of a method for processing video data, according to some embodiments of the present disclosure.

The above-described embodiments can be performed as part of a video data processing process, such as encoding process 200A (FIG. 2A) or 200B (FIG. 2B), or decoding process 300A (FIG. 3A) or 300B (FIG. 3B). FIG. 7 is a flow chart of a method 700 for processing video data, according to some embodiments of the present disclosure. Method 700 is used to combine (i.e., fusing) multiple different chroma intra prediction modes to generate an intra predicted chroma block. Method 700 can be performed by an encoder or by a decoder, or performed by one or more software or hardware components of an apparatus (e.g., apparatus 400 of FIG. 4), in predicting a chroma block. For example, one or more processors (e.g., processor 402 of FIG. 4) can perform method 700. In some embodiments, method 700 can be implemented by a computer program product, embodied in a computer-readable medium, including computer-executable instructions such as program code, executed by computers (e.g., apparatus 400 of FIG. 4). As shown in FIG. 7, method 700 includes the following steps 710-740.

At step 710, a processor (e.g., processor 402 of FIG. 4) determines a plurality of chroma intra prediction modes. The plurality of chroma intra prediction modes can be applied to a target chroma block to obtain a plurality of predicted chroma blocks, respectively. The resulted plurality of predicted chroma blocks can be combined to generate a final predicted chroma block. In some embodiments, the plurality of chroma intra prediction modes may include at least one LM mode and at least one non-LM mode. The at least one LM mode may include one or more of a CCLM_LT mode, a CCLM_L mode, a CCLM_T mode, an MMLM_LT mode, an MMLM_L mode, or an MMLM_T mode. The at least one non-LM mode may include one or more of: a DM mode, a default mode, or a decoder-side derived chroma mode. In some embodiments, the plurality of chroma intra prediction modes may include an MMLM_LT mode and at least one non-LM mode. In some embodiments, the plurality of chroma intra prediction modes may include a decoder-side derived chroma mode and at least one non-LM mode.

In some embodiments, the plurality of chroma intra prediction modes may be signaled by one or more flags in a bitstream. For example, the plurality of chroma intra prediction modes may include two modes, referred herein to as a first mode and a second mode. If method 700 is performed by a decoder (e.g., process 300A of FIG. 3A or 300B of FIG. 3B), the processor decodes a first flag signaled in a bitstream, and determines, based on a value of the first flag, whether to select the first mode from a first set of modes including the DM mode, the four default modes and the decoder-side derived chroma mode. The processor also decodes a second flag signaled in the bitstream, and determines, based on a value of the second flag, whether to select the second mode from a second set of modes including the CCLM_LT mode and MMLM_LT mode. Correspondingly, if method 700 is performed by an encoder (e.g., by process 200A of FIG. 2A or 200B of FIG. 2B), the processor encodes, in a bitstream, one or more flags associated with the plurality of chroma intra prediction modes. For example, the one or more flags may include a first flag indicating whether one of the plurality of chroma intra prediction modes is selected from a first set of modes including the DM mode, the four default modes and the decoder-side derived chroma mode. And the one or more flags may include a second flag indicating whether another one of the plurality of chroma intra prediction modes is selected from a second set of modes including the CCLM_LT mode and MMLM_LT mode.

In some embodiments, one or more of the plurality of chroma intra prediction modes may be determined implicitly. For example, the plurality of chroma intra prediction modes may include two modes, referred herein to as a first mode and a second mode. If method 700 is performed by a decoder (e.g., process 300A of FIG. 3A or 300B of FIG. 3B), the processor decodes a flag signaled in a bitstream, and determines, based on a value of the flag, whether to select the first mode from a first set of modes including the DM mode, the four default modes and the decoder-side derived chroma mode. Then, based on the mode selected from the first set of modes, the processor selects the second mode from a second set of modes including the CCLM_LT mode, CCLM_L mode and CCLM_T mode. For example, if the mode selected from the first set of modes is a non-angular mode, the second mode is determined to be the CCLM_LT mode; if the mode selected from the first set of modes is a horizontal mode, the second mode is determined to be the CCLM_L mode; if the mode selected from the first set of modes is a vertical mode, the second mode is determined to be the CCLM_T mode.

In some embodiments, the explicit signaling method and the implicit method are combined to determine one or more of the plurality of chroma intra prediction modes. For example, the plurality of chroma intra prediction modes may include two modes, referred herein to as a first mode and a second mode. If method 700 is performed by a decoder (e.g., process 300A of FIG. 3A or 300B of FIG. 3B), the processor decodes a first flag signaled in a bitstream, and determines, based on a value of the first flag, whether to select the first mode from a first set of modes including the DM mode, the four default modes and the decoder-side derived chroma mode. The processor also decodes a second flag signaled in the bitstream, and determines, based on a value of the second flag, whether to select the second mode from a second set of modes including the CCLM_LT mode, CCLM_L mode, CCLM_T mode, MMLM_LT mode, MMLM_L mode, and MMLM_T mode. Then, based on the type of the mode selected from the first set of modes, the processor determines which mode in the second set of mode shall be selected for the second mode. For example, if the mode selected from the first set of modes is a non-angular mode, the second mode is determined to be one of the CCLM_LT mode or MMLM_LT mode; if the mode selected from the first set of modes is a horizontal mode, the second mode is determined to be one of the CCLM_L mode or MMLM_L mode; if the mode selected from the first set of modes is a vertical mode, the second mode is determined to be one of the CCLM_T mode or MMLM_T mode.

In some embodiments, the processor determines the plurality of chroma intra prediction modes based on a slice type associated with the target chroma block. For example, in response to the target chroma block being associated with an I slice, the processor determines the plurality of chroma intra prediction modes to include at least one of a DM mode, a default mode, or a decoder-side derived chroma mode; or in response to the target chroma block being associated with a B slice or a P slice, the processor determines the plurality of chroma intra prediction modes to include a decoder-side derived chroma mode.

At step 720, the processor generates a plurality of predicted chroma samples associated with a pixel, by using the plurality of chroma intra prediction modes respectively. The pixel is in the target chroma block.

At step 730, the processor determines a plurality of weights for the plurality of chroma intra prediction modes, respectively. The plurality of weights is used for determining a weighted sum of the plurality of predicted chroma samples. A sum of the plurality of weights is equal to 1. The plurality of weights can be equal or unequal. For example, if the plurality of chroma intra prediction modes has two modes, the processor may set the weight for each of the two modes to be equal to ½. As another example, if the plurality of chroma intra prediction modes is determined to include an LM mode and a non-LM mode (step 710), the processor may assign unequal weights to the LM mode and non-LM mode, such as ¼ to the LM mode and ¾ to the non-LM mode.

In some embodiments, an index pointing to the plurality of weights may be signaled in a bitstream. Specifically, a lookup table including multiple sets of weights and their respective indices is predetermined. By signaling one of the indices in the bitstream, a video decoder can know which set of weights is used. More specifically, if method 700 is performed by a decoder (e.g., process 300A of FIG. 3A or 300B of FIG. 3B), the processor decodes an index signaled in a bitstream and determines, based on the lookup table, a set of weights associated with the index. Correspondingly, if method 700 is performed by an encoder (e.g., by process 200A of FIG. 2A or 200B of FIG. 2B), the processor selects, from the lookup table, an index associated with the set of weights used for determining the weighted sum of the plurality of predicted chroma samples. The processor then encodes the selected index in the bitstream.

In some embodiments, the processor may determine the plurality of weights based on the intra prediction modes used for predicting neighboring chroma blocks of the target chroma block. For example, the neighboring chroma blocks include a neighboring block above the target chroma block and a neighboring block on a left side of the target chroma block. For example, the plurality of chroma intra prediction modes is determined to include a LM mode and a non-LM mode (step 710). Then, if both the above and left neighboring blocks are LM mode coded, the processor determines the weights for the LM mode and the non-LM mode to be ¾ and ¼ respectively; if both the above and left neighboring blocks are non-LM mode coded, the processor determines the weights for the LM mode and the non-LM mode to be ¼ and ¾ respectively; if one of the above and left neighboring blocks are LM mode coded and the other one is non-LM mode coded, the processor determines the weights for the LM mode and the non-LM mode to be equal, i.e., ½. In some embodiments, the determining of the plurality of weights based on the intra prediction modes used for predicting the neighboring chroma blocks of the target chroma block may be triggered by certain predefined conditions. For example, if the plurality of chroma intra prediction modes determined at step 710 includes an LM mode and a non-LM mode, and if the non-LM mode is a non-angular mode, the processor triggers the method of determining the plurality of weights based on the intra prediction modes used for predicting the neighboring chroma blocks of the target chroma block.

In some embodiments, the processor may determine the plurality of weights based on sample positions in the target chroma block. For example, the plurality of chroma intra prediction modes determined at step 710 includes a non-angular mode and an angular mode. The non-angular mode can be one of a planar mode, a DC mode, or an LM mode. Then, the processor may determine the weights for the angular mode and non-angular mode as follows: the processor first splits the target chroma block vertically (for horizontal modes) or horizontally (for vertical modes) into four equal-area regions, and then assigns different sets of weights to different regions. As another example, the processor may set the weight associated with the angular mode to be proportional to the distance from a pixel position of the current sample to a pixel position of a reference sample, while the weight associated with the non-angular mode to be inversely proportional to the distance. In some embodiments, the determining of the plurality of weights based on the sample positions in the target chroma block may be triggered by certain predefined conditions. For example, if the plurality of chroma intra prediction modes determined at step 710 includes an LM mode and a non-LM mode, and if the non-LM mode is an angular mode, the processor triggers the method of determining the plurality of weights based on the sample positions in the target chroma block.

In some embodiments, the processor may determine the plurality of weights based on a slice type associated with the target chroma block. For example, in response to the first predicted chroma sample being associated with an I slice, the processor determines the plurality of weights, based on chroma intra prediction modes used for predicting one or more neighboring blocks of the target chroma block; or in response to the first predicted chroma sample being associated with a B slice or a P slice, the processor determines the plurality of weights to have equal values.

At step 740, the processor determines a first predicted chroma sample associated with the pixel, based on a weighted sum of the plurality of predicted chroma samples. The first predicted chroma sample is calculated according to Equation 6. The processor repeats the calculation for each pixel in the target chroma block, and the resulted predicted chroma samples form the final predicted chroma block.

In some embodiments, a non-transitory computer-readable storage medium storing a bitstream for processing according to the above-described methods is also provided. For example, the bitstream includes encoded syntax elements, e.g., flags, indices, etc., that indicate the chroma intra prediction modes to be fused or the weights respectively associated with the chroma intra prediction modes. Moreover, in some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The embodiments may further be described using the following clauses:

1. A video processing method, comprising:
    generating a plurality of predicted chroma samples associated with a pixel, by using a plurality of chroma intra prediction modes respectively; and
    determining a first predicted chroma sample, based on a weighted sum of the plurality of predicted chroma samples.

2. The method of clause 1, wherein the plurality of chroma intra prediction modes comprises at least one Linear Model (LM) mode and at least one non-LM mode.

3. The method of clause 2, wherein:
    the at least one LM mode comprises one or more of a Cross Component Linear Model LT (CCLM_LT) mode, a CCLM_L mode, a CCLM_T mode, a Multi-Model Linear Model LT (MMLM_LT) mode, an MMLM_L mode, an MMLM_T mode, a Convolutional Cross-Component Model (CCCM) mode, or a Gradient Linear Model (GLM) mode; and the at least one non-LM mode comprises one or more of: a Direct Mode (DM) mode, a default mode, or a decoder-side derived chroma mode.

4. The method of clause 1, wherein the plurality of chroma intra prediction modes comprises a Multi-Model Linear Model LT (MMLM_LT) mode and at least one non-LM mode.

5. The method of clause 1, wherein the plurality of chroma intra prediction modes comprises a decoder-side derived chroma mode and at least one LM mode.

6. The method of clause 1, further comprising:
 determining a plurality of weights for the plurality of chroma intra prediction modes respectively, wherein a sum of the plurality of weights is equal to 1.

7. The method of clause 1, wherein the plurality of chroma intra prediction modes are weighted equally in determining the first predicted chroma sample.

8. The method of clause 1, wherein:
 the plurality of chroma intra prediction modes comprises a Linear Model (LM) mode and a non-LM mode, and
 the LM mode and non-LM mode are weighted unequally in determining the first predicted chroma sample.

9. The method of clause 1, wherein the method is used for decoding a bitstream and further comprises:
 determining a plurality of weights based on an index signaled in a bitstream; and
 determining the weighted sum of the plurality of predicted chroma samples by using the determined plurality of weights.

10. The method of clause 1, wherein the method is used for encoding video data and further comprises:
 encoding, in a bitstream, an index associated with a plurality of weights used for determining the weighted sum of the plurality of predicted chroma samples.

11. The method of clause 1, wherein the first predicted chroma sample is part of a first predicted chroma block, and the method further comprises:
 determining a plurality of weights, based on chroma intra prediction modes used for predicting one or more neighboring blocks of the first predicted chroma block; and
 determining the weighted sum of the plurality of predicted chroma samples by using the determined plurality of weights.

12. The method of clause 11, wherein the one or more neighboring blocks comprise:
 a neighboring block above the first predicted chroma block and a neighboring block on a left side of the first predicted chroma block.

13. The method of clause 11, wherein the plurality of chroma intra prediction modes comprises a Linear Model (LM) mode and a non-LM mode, and the determining of the plurality of weights based on the chroma intra prediction modes used for predicting the one or more neighboring blocks is triggered by a determination that the non-LM mode is a non-angular mode.

14. The method of clause 1, further comprising:
 determining a plurality of weights based on a pixel position of the first predicted chroma sample; and
 determining the weighted sum of the plurality of predicted chroma samples by using the determined plurality of weights.

15. The method of clause 14, wherein the plurality of predicted chroma samples comprises an angular mode, and the method further comprises:
 determining a weight of the angular mode based on a pixel position of the first predicted chroma sample in a predicted chroma block.

16. The method of clause 14, wherein the plurality of predicted chroma samples comprises an angular mode or a non-angular mode, and the method further comprises:
 determining at least one of a weight of the angular mode or a weight of the non-angular mode based on a distance from the first predicted chroma sample to a reference sample.

17. The method of clause 16, wherein the weight of the angular mode is proportional to the distance from the first predicted chroma sample to the reference sample.

18. The method of clause 16, wherein the weight of the non-angular mode is inversely proportional to the distance from the first predicted chroma sample to the reference sample.

19. The method of clause 14, wherein the plurality of chroma intra prediction modes comprises a Linear Model (LM) mode and a non-LM mode, and the determining of the plurality of weights based on the position of the first predicted chroma sample is triggered by a determination that the non-LM mode is an angular mode.

20. The method of clause 1, wherein the method is used for decoding a bitstream and further comprises:
 determining the plurality of chroma intra prediction modes based on one or more flags signaled in the bitstream.

21. The method of clause 20, wherein:
 the plurality of chroma intra prediction modes comprises a first mode and a second mode;
 the bitstream signals a first set of chroma intra prediction modes and a second set of chroma intra prediction modes; and
 the method further comprises:
  determining, based on a value of a first flag signaled in the bitstream, whether to select the first mode from the first set of chroma intra prediction modes; and
  determining, based on a value of a second flag signaled in the bitstream, whether to select the second mode from the second set of chroma intra prediction modes.

22. The method of clause 21, wherein:
 the first set of chroma intra prediction modes comprises a DM mode, a default mode, and a decoder-side derived chroma mode; and
 the second set of chroma intra prediction modes comprises a CCLM_LT mode and an MMLM_LT mode.

23. The method of clause 21, further comprising:
 selecting one of the first set of chroma intra prediction modes to be the first mode; and
 selecting one of the second set of chroma intra prediction modes to be the second mode, based on the mode selected from the first set of chroma intra prediction modes.

24. The method of clause 23, wherein:
 the second set of chroma intra prediction modes comprises a CCLM_LT mode, a CCLM_L mode, a CCLM_T mode, an MMLM_LT mode, an MMLM_L mode, and an MMLM_T mode; and
 selecting one of the second set of chroma intra prediction modes to be the second mode comprises:
  in response to the first mode being a non-angular mode, selecting one of the CCLM_LT mode or the MMLM_LT mode to be the second mode;

in response to the first mode being a horizontal mode, selecting one of the CCLM_L mode or the MMLM_L mode to be the second mode; or in response to the first mode being a vertical mode, selecting one of the CCLM_T mode or the MMLM_T mode to be the second mode.

25. The method of clause 20, wherein:
the plurality of chroma intra prediction modes comprises a first mode and a second mode;
the bitstream signals a first set of chroma intra prediction modes; and
the method further comprises:
selecting, based on a value of a first flag signaled in the bitstream, one of the first set of chroma intra prediction modes to be first mode; and
determining the second mode based on the selected mode.

26. The method of clause 25, wherein determining the second mode based on the selected mode comprises:
in response to the selected mode being a non-angular mode, determining the second mode to be an CCLM_LT mode;
in response to the selected mode being a horizontal mode, determining the second mode to be an CCLM_L mode; or
in response to the selected mode being a vertical mode, determining the second mode to be an CCLM_T mode.

27. The method of clause 1, wherein the method is used for encoding video data and further comprises:
encoding, in a bitstream, one or more flags associated with the plurality of chroma intra prediction modes.

28. The method of clause 1, further comprising:
determining the plurality of chroma intra prediction modes based on a slice type associated with the first predicted chroma sample.

29. The method of clause 28, further comprising:
in response to the first predicted chroma sample being associated with an I slice, determining the plurality of chroma intra prediction modes to comprise at least one of a DM mode, a default mode, or a decoder-side derived chroma mode; or
in response to the first predicted chroma sample being associated with a B slice or a P slice, determining the plurality of chroma intra prediction modes to comprise a decoder-side derived chroma mode.

30. The method of clause 1, further comprising:
determining a plurality of weights based on a slice type associated with the first predicted chroma sample; and
determining the weighted sum of the plurality of predicted chroma samples by using the determined plurality of weights.

31. The method of clause 30, further comprising:
in response to the first predicted chroma sample being associated with an I slice, determining the plurality of weights, based on chroma intra prediction modes used for predicting one or more neighboring blocks of the first predicted chroma block; or
in response to the first predicted chroma sample being associated with a B slice or a P slice, determining the plurality of weights to have equal values.

32. An apparatus, comprising:
a memory configured to store a set of instructions; and
one or more processors configured to execute the set of instructions to cause the apparatus to perform:
generating a plurality of predicted chroma samples associated with a pixel, by using a plurality of chroma intra prediction modes respectively; and
determining a first predicted chroma sample, based on a weighted sum of the plurality of predicted chroma samples.

33. A non-transitory computer readable medium storing a bitstream of video for processing according to a method comprising:
generating a plurality of predicted chroma samples associated with a pixel, by using a plurality of chroma intra prediction modes respectively; and
determining a first predicted chroma sample, based on a weighted sum of the plurality of predicted chroma samples.

34. A non-transitory computer readable medium storing a set of instructions that is executable by one or more processors of an apparatus to cause the apparatus to initiate a method for processing video data, the method comprising:
generating a plurality of predicted chroma samples associated with a pixel, by using a plurality of chroma intra prediction modes respectively; and
determining a first predicted chroma sample, based on a weighted sum of the plurality of predicted chroma samples.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:
generating a plurality of predicted chroma samples associated with a pixel, by using a plurality of chroma intra prediction modes respectively; and
determining a first predicted chroma sample in a first predicted chroma block, based on a weighted sum of the plurality of predicted chroma samples,
wherein the determining of the first predicted chroma sample based on the weighted sum of the plurality of predicted chroma samples comprises:
in response to the first predicted chroma sample being associated with an I slice, determining a plurality of weights, based on chroma intra prediction modes used for predicting one or more neighboring blocks of the first predicted chroma block, or
in response to the first predicted chroma sample being associated with a B slice or a P slice, determining the plurality of weights to have equal values; and
determining the weighted sum of the plurality of predicted chroma samples by applying the determined plurality of weights to the plurality of predicted chroma samples, respectively.

2. The method of claim 1, wherein the plurality of chroma intra prediction modes comprises at least one Linear Model (LM) mode and at least one non-LM mode.

3. The method of claim 2, wherein:
the at least one LM mode comprises one or more of a Cross Component Linear Model LT (CCLM_LT) mode, a CCLM_L mode, a CCLM_T mode, a Multi-Model Linear Model LT (MMLM_LT) mode, an MMLM_L mode, an MMLM_T mode, a Convolutional Cross-Component Model (CCCM) mode, or a Gradient Linear Model (GLM) mode; and
the at least one non-LM mode comprises one or more of:
a Direct Mode (DM) mode, a default mode, or a decoder-side derived chroma mode.

4. The method of claim 1, wherein the plurality of chroma intra prediction modes comprises a Multi-Model Linear Model LT (MMLM_LT) mode and at least one non-LM mode.

5. The method of claim 1, wherein the plurality of chroma intra prediction modes comprises a decoder-side derived chroma mode and at least one LM mode.

6. The method of claim 1,
wherein a sum of the plurality of weights is equal to 1.

7. The method of claim 1, further comprising:
encoding a bitstream comprising syntax elements indicating the plurality of weights.

8. The method of claim 1, wherein the one or more neighboring blocks comprise:
a neighboring block above the first predicted chroma block and a neighboring block on a left side of the first predicted chroma block.

9. The method of claim 1, wherein the method is used for decoding a bitstream and further comprises:
determining the plurality of chroma intra prediction modes based on one or more flags signaled in the bitstream.

10. The method of claim 9, wherein:
the plurality of chroma intra prediction modes comprises a first mode and a second mode;
the bitstream comprises a first flag and a second flag, the first and second flags being respectively associated with a first set of chroma intra prediction modes and a second set of chroma intra prediction modes; and
the method further comprises:
decoding the first and second flags;
determining, based on a value of the first flag, whether to select the first mode from the first set of chroma intra prediction modes; and
determining, based on a value of the second flag, whether to select the second mode from the second set of chroma intra prediction modes.

11. The method of claim 10, wherein:
the first set of chroma intra prediction modes comprises a DM mode, a default mode, and a decoder-side derived chroma mode; and
the second set of chroma intra prediction modes comprises an MMLM_LT mode.

12. The method of claim 1, further comprising:
determining the plurality of chroma intra prediction modes based on a slice type associated with the first predicted chroma sample.

13. The method of claim 12, further comprising:
in response to the first predicted chroma sample being associated with an I slice, determining the plurality of chroma intra prediction modes to comprise at least one of a DM mode, a default mode, or a decoder-side derived chroma mode; or
in response to the first predicted chroma sample being associated with a B slice or a P slice, determining the plurality of chroma intra prediction modes to comprise a decoder-side derived chroma mode.

14. An apparatus, comprising:
a memory configured to store a set of instructions; and
one or more processors configured to execute the set of instructions to cause the apparatus to perform:
generating a plurality of predicted chroma samples associated with a pixel, by using a plurality of chroma intra prediction modes respectively; and
determining a first predicted chroma sample in a first predicted chroma block, based on a weighted sum of the plurality of predicted chroma samples,
wherein in determining the first predicted chroma sample, the one or more processors are configured to execute the set of instructions to cause the apparatus to perform:
in response to the first predicted chroma sample being associated with an I slice, determining a plurality of weights, based on chroma intra prediction modes used for predicting one or more neighboring blocks of the first predicted chroma block, or
in response to the first predicted chroma sample being associated with a B slice or a P slice, determining the plurality of weights to have equal values; and
determining the weighted sum of the plurality of predicted chroma samples by applying the determined plurality of weights to the plurality of predicted chroma samples, respectively.

15. The apparatus of claim 14, wherein the one or more processors are configured to execute the set of instructions to cause the apparatus to perform:
determining the plurality of chroma intra prediction modes based on a slice type associated with the first predicted chroma sample.

16. The apparatus of claim 14, wherein the one or more neighboring blocks comprise:
a neighboring block above the first predicted chroma block and a neighboring block on a left side of the first predicted chroma block.

17. The apparatus of claim 14, wherein the plurality of chroma intra prediction modes comprises a Multi-Model Linear Model LT (MMLM_LT) mode and at least one non-LM mode.

18. A method of storing a bitstream of video, the method comprising:
  generating a plurality of predicted chroma samples associated with a pixel, by using a plurality of chroma intra prediction modes respectively;
  determining a first predicted chroma sample in a first predicted chroma block, based on a weighted sum of the plurality of predicted chroma samples;
  generating a bitstream comprising encoded information indicative of the first predicted chroma samples; and
  storing the bitstream in a non-transitory computer readable medium,
  wherein the determining of the first predicted chroma sample based on the weighted sum of the plurality of predicted chroma samples comprises:
    in response to the first predicted chroma sample being associated with an I slice, determining a plurality of weights, based on chroma intra prediction modes used for predicting one or more neighboring blocks of the first predicted chroma block, or
    in response to the first predicted chroma sample being associated with a B slice or a P slice, determining the plurality of weights to have equal values; and
    determining the weighted sum of the plurality of predicted chroma samples by applying the determined plurality of weights to the plurality of predicted chroma samples, respectively.

19. The method of claim 18, wherein the one or more neighboring blocks comprise:
  a neighboring block above the first predicted chroma block and a neighboring block on a left side of the first predicted chroma block.

20. The method of claim 18, wherein the plurality of chroma intra prediction modes comprises a Multi-Model Linear Model LT (MMLM_LT) mode and at least one non-LM mode.

* * * * *